United States Patent [19]
Keisner

[11] Patent Number: 6,145,473
[45] Date of Patent: Nov. 14, 2000

[54] PET FOOD AND WATER DISPENSER

[76] Inventor: Lawrence G. Keisner, 4615 Stoner Ave., Culver City, Calif. 90230-5769

[21] Appl. No.: 09/179,912

[22] Filed: Oct. 27, 1998

[51] Int. Cl.⁷ .................... A01K 5/00; A01K 7/00
[52] U.S. Cl. ................ 119/53; 119/52.1; 119/77
[58] Field of Search ............... 119/52.1, 53, 77, 119/78

[56] References Cited

U.S. PATENT DOCUMENTS

| | | | |
|---|---|---|---|
| 2,618,237 | 11/1952 | McDermott | 119/77 X |
| 4,355,598 | 10/1982 | Saylor | 119/52.1 |
| 5,649,499 | 7/1997 | Krietzman et al. | 119/52.1 |
| 5,904,117 | 5/1999 | Castro | 119/51.5 |

*Primary Examiner*—Robert P. Swiatek
*Attorney, Agent, or Firm*—Robert M. Sperry

[57] ABSTRACT

A pet food dispenser comprising a base, a bowl mounted on the base for retaining a quantity of a substance to be dispensed, a reservoir mounted adjacent one side of the base and operable to deliver a desired substance into the bowl, and a cover movable into and out of a position to cover the bowl.

18 Claims, 3 Drawing Sheets

PET FOOD AND WATER DISPENSER

FIELD OF INVENTION

This invention relates to pet animals and is particularly directed to improved dispensers for pet food and water.

PRIOR ART

One of the major problems with keeping pet animals is the necessity of providing food and water on a frequent or constant basis. Many pet food dispensers have been proposed heretofore. However, most of the prior art pet food dispensers have been subject to spillage or could easily be upset by the pet or by someone knocking against the dispenser, resulting in wasted food and a messy cleanup job. Other prior art pet food dispensers have been open topped and, hence, have allowed dirt an other contaminants access to the food. Still other prior art pet food dispensers have been expensive to purchase and complicated to use. A search in the United States Patent Office has revealed the following references:

| PATENT NO. | INVENTOR | ISSUED |
| --- | --- | --- |
| 5,016,572 | F. J. Weber et al | May 21, 1991 |
| 3,749,063 | E. G. Buffum | Jul. 31, 1973 |
| 3,455,280 | P. M. Keene | Jul. 15, 1969 |
| 2,813,509 | A. C. Bruno | Nov. 17, 1957 |
| 2,006,428 | C. H. Zwermann | July 2, 1935 |
| Fr. 2,227,819 | Pech | Nov. 11, 1974 |
| Des. 355,056 | R. A. Burnet | Jan. 31, 1995 |
| Des. 303,853 | S. F. Keller | Oct. 3, 1989 |
| Des. 300,278 | J. I. Morrell | Mar. 14, 1989 |
| Des. 217,060 | L. A. Wilson | Mar. 31, 1970 |
| Des. 195,251 | B. A. Ogilvie | May 21, 1963 |

Each of these referencesw is subject to one or more of the disadvantages discussed above. Thus, none of the prior art pet food dispensers has been entirely satisfactory.

BRIEF SUMMARY AND OBJECTS OF THE INVENTION

These disadvantages of the prior art are overcome with the present invention and an improved pet food dispenser is provided which is inexpensive to purchase and simple to use, yet which prevents dirt and other contaminants from getting into the food and which prevents spillage due to someone knocking against the device.

These advantages of the present invention are preferably attained by providing an improved pet food dispenser comprising a base, a bowl mounted on said base for retaining a quantity of a substance to be dispensed, a reservoir mounted adjacent one side of said base and operable to deliver a desired substance into said bowl, and a cover movable into and out of a position to cover said bowl.

Accordingly, it is an object of the present invention to provide an improved pet food dispenser.

Another object of the present invention is to provide an improved pet food dispenser which is inexpensive to purchase.

An additional object of the present invention is to provide an improved pet food dispenser which is simple to operate.

A further object of the present invention is to provide an improved pet food dispenser which prevents dirt and other contaminants from getting into the food.

Another object of the present invention is to provide an improved pet food dispenser which prevents spillage due to someone knocking against the device.

A specific object of the present invention is to provide an improved pet food dispenser comprising a base, a bowl mounted on said base for retaining a quantity of a substance to be dispensed, a reservoir mounted adjacent one side of said base and operable to deliver a desired substance into said bowl, and a cover movable into and out of a position to cover said bowl.

These and other objects and features of the present invention will be apparent form the following detailed description, taken with reference to the figures of the accompanying drawing.

DETAILED DESCRIPTION OF THE INVENTION

Figure 1:
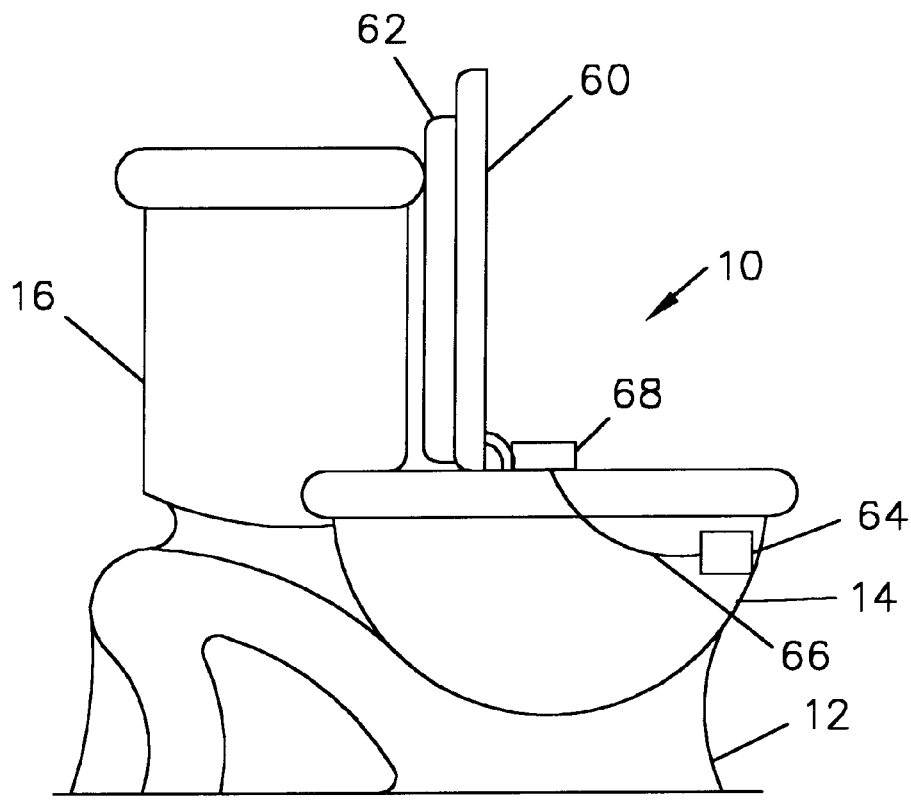
FIG. 1 is a side view of a pet food dispenser embodying the present invention.
Figure 2:
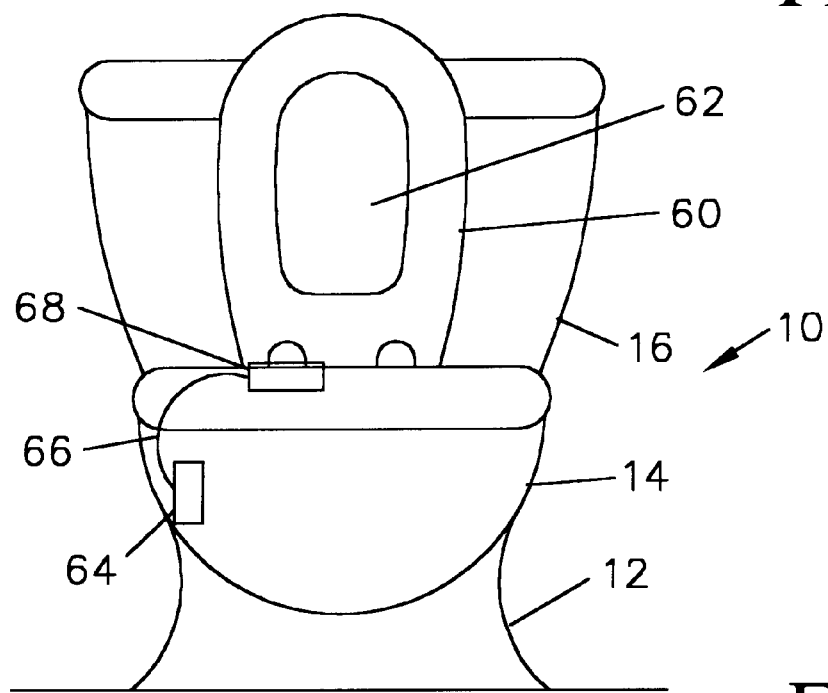
FIG. 2 is a front view of the pet food dispenser of FIG. 1.
Figure 3:
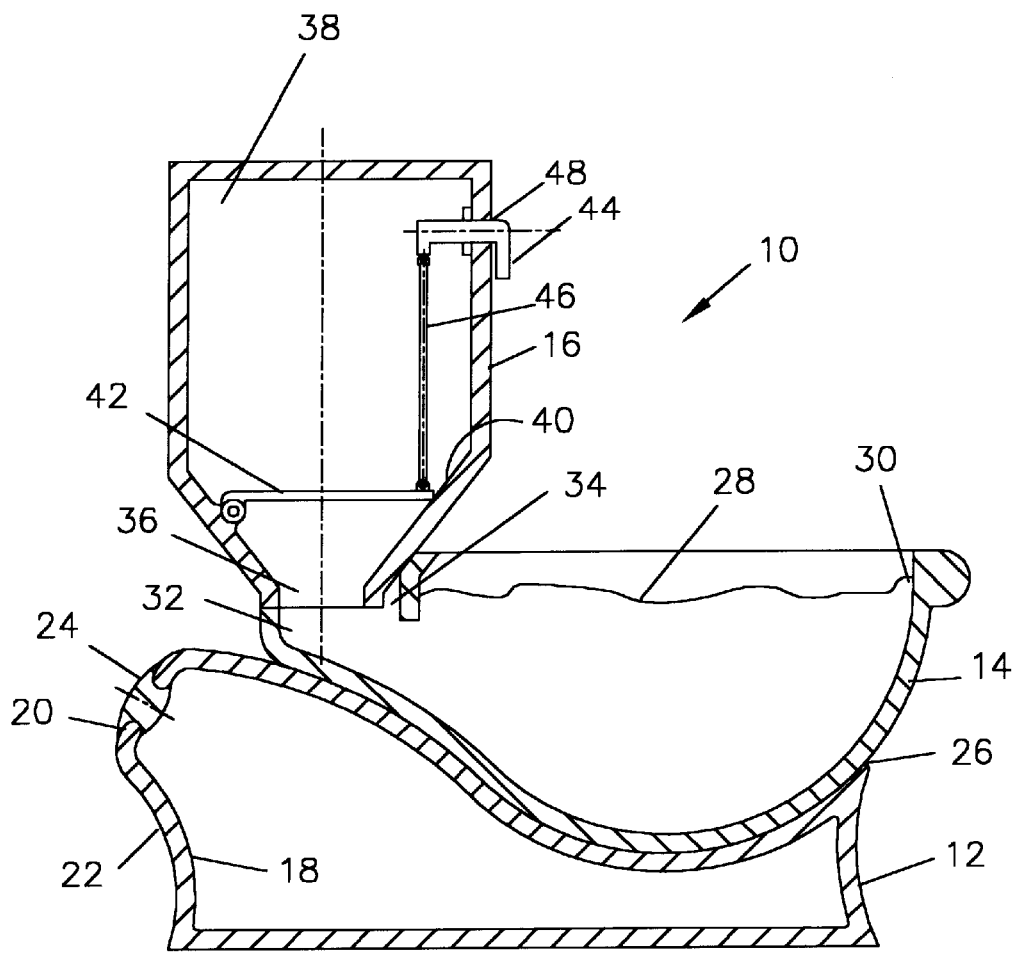
FIG. 3 is a vertical section through the pet food dispenser of FIG. 1.

In that form of the present invention chosen for purposes of illustration, FIG. 1 shows a pet food dispenser, indicated generally at 10, having a base 12 supporting a bowl 14 and a reservoir 16. As shown, the bowl 14 and reservoir 16 are mounted on the base 12. The base 12 may be solid or, as seen in FIG. 3, may be formed hollow, having an interior chamber 18 which can be filled with water, sand or other suitable ballast, through opening 20 which is formed in the side wall 22 of the base 12 and is closed by a suitable plug 24. The upper surface 26 of the base 12 is concave to receive and support the bowl 14. The bowl 14 serves to contain a quantity of water, pet food or the like, as indicated at 28, and has an opening 30 formed in the upper surface to provide access for pets to the water or other material 28. The bowl 14 also has a rearward extension 32, having an opening 34 formed to receive the neck 36 of the reservoir 16. As seen in FIG. 3, the reservoir 16 is hollow and has a generally rectangular chamber 38 with a tapered portion 40 which leads to the neck 36.

In use, the reservoir 16 is removed and is filled, through the open neck 36, with water, pet food or the like and is inverted and placed on the extension 32 of the bowl 14 to enable the water, pet food or the like to flow through opening 34 of neck 36 into the bowl 14. When this is done, atmospheric pressure on the surface of the material in bowl 14 will exceed the pressure on the material within chamber 38 of reservoir 16, which will prevent the material from overflowing and spilling out of the bowl 14. Also, as the material flows out of chamber 38, a vacuum will be created within chamber 38 above the material which will aid in preventing undesired flow of the material out of chamber 38 of reservoir 16. Thereafter, the pet can access the material 28 in the bowl 14 through opening 30 whenever they choose and the pet owner need only check the reservoir 16 occasionally to ensure that the reservoir 16 is not empty.

Figure 4:
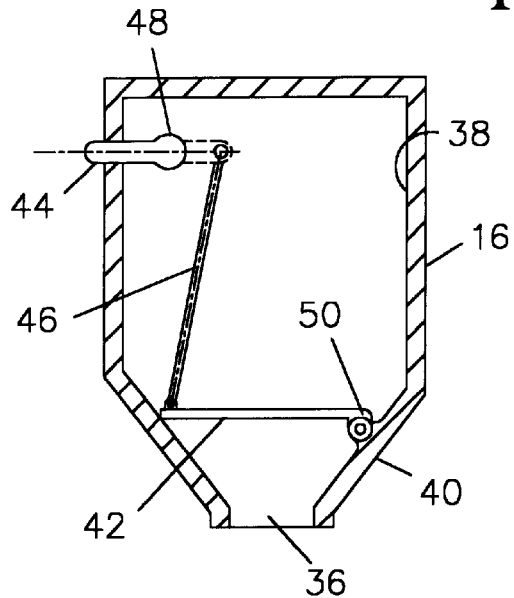
FIG. 4 is a diagrammatic representation showing one means for actuating the reservoir of the pet food dispenser of FIG. 1.
Figure 5:
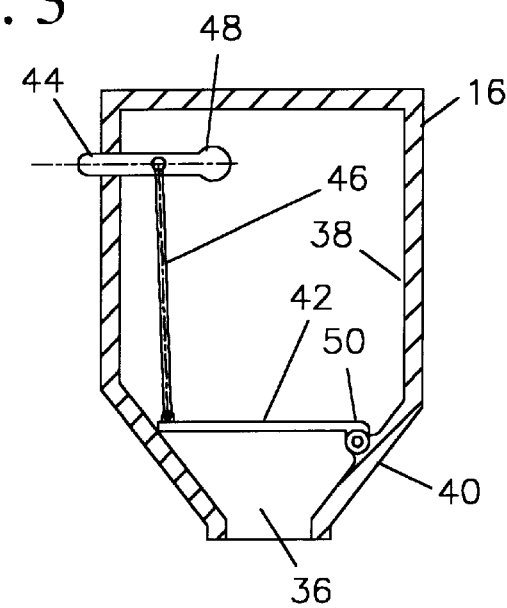
FIG. 5 is a diagrammatic representation showing an alternative means for actuating the reservoir of the pet food dispenser of FIG. 1.
Figure 6:
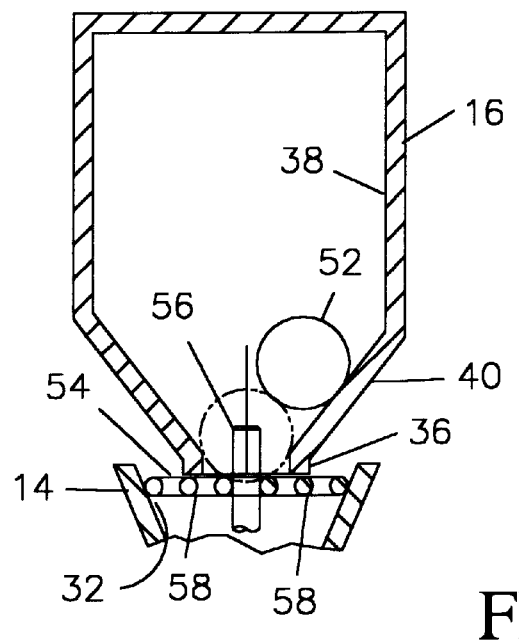
FIG. 6 is a diagrammatic representation showing another alternative means for actuating the reservoir of the pet food dispenser of FIG. 1.

If desired, the reservoir 16 can be provided with flow control means, such as valve 42, which is actuated by handle 44 and connecting rod 46. As seen in FIGS. 3 and 4, the connecting rod 46 is connected to handle 44 beyond the pivot point 48 and valve 42 is hingedly mounted within the chamber 38 of reservoir 16, as seen at 50. Thus, when the handle 44 is pressed downward, it acts to lift connecting rod 46 and, hence, raises valve 42 to allow material within chamber 38 of reservoir 16 to flow out through neck 36 into bowl 14. Alternatively, as seen in FIG. 5, connecting rod 46 may be connected to handle 44 on the near side of pivot point 48. In this instance, valve 42 extends generally across the lower end of chamber 38 of the reservoir 16 and pressing downward on handle 44 causes connecting rod 46 to push the valve 42 downward against the tapered portion 40 of the reservoir 16 to allow material to flow out of chamber 38. FIG. 6 shows another alternative form of flow control means in which reservoir 16 contains a ball valve 52 which normally rests in the tapered portion 40 of reservoir 16 to prevent material from flowing out of neck 36. In this instance, a grate 54 covers opening 32 of bowl 14 and is formed with a central stud 56 which projects upward from grate 54 to displace ball valve 52 and to allow material from within chamber 38 of reservoir 16 to flow through a plurality of openings 58 formed in grate 54 into bowl 14.

Also, as seen in FIG. 1, a ring 60, simulating a toilet seat, and lid 62 may be formed integral with the reservoir 16 or, if desired, may be hingedly attached, either singly or as a combined unit, to the bowl 14, which allows the ring 60 and lid 62 to be moved into and out of a position to cover opening 30 of the bowl 14 to prevent contamination of the material 28 within the bowl 14 and to restrict access by the pet to the material 28. If desired, a motion sensor 64, such as an infrared detector, can be mounted on the bowl 14 in a convenient location to detect approaching pets and can be connected, as by wires 66, to actuate a motor 68, which can serve to raise and lower the ring 60 and lid 62.

Figure 7:
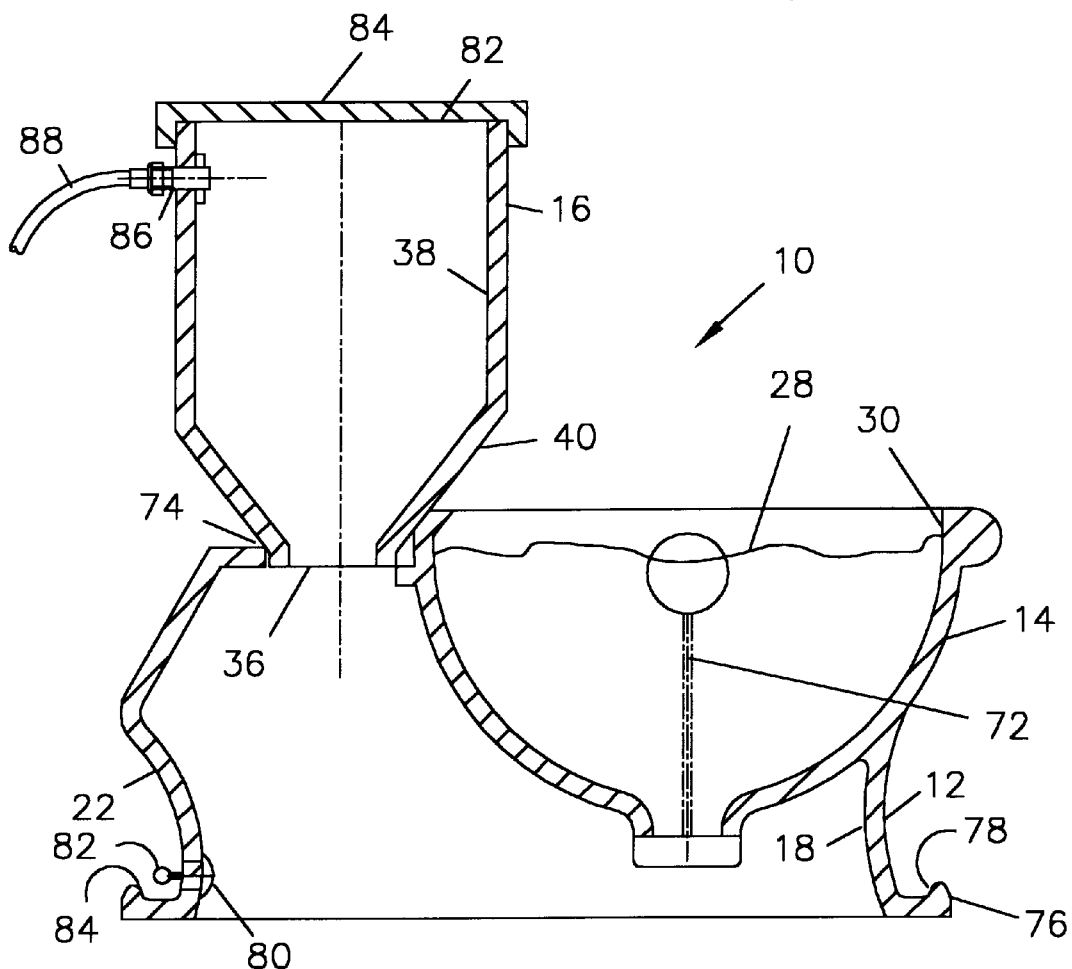
FIG. 7 is a vertical section through an alternative form of the pet food dispenser of FIG. 1.

FIG. 7 shows an alternative form of the pet food dispenser 10 wherein the bowl 14 is formed integral with the base 12 and has a central opening 70 communicating with chamber 18 within the base 12 and having flow regulating means, such as float valve 72, to control the flow of water into the bowl 14 from chamber 18 of the base 12. In this form of the invention, the base 12 has an opening 74 for receiving the neck 36 of reservoir 16. Preferably, the reservoir 16 is releasably connected to the base 12, as by a friction fit of neck 36 with opening 74 of by mating threads on the facing surfaces of neck 36 and opening 74, to enable the user to lift and transport the pet food dispenser 10, as an integral unit, by grasping and lifting on the reservoir 16. Also, in this form of the invention, the base 12 is provided with a peripheral generally L-shaped flange 76 defining a channel 78 encircling the base 12 and has an opening 80 communicating the channel 78 with chamber 18 within the base 12 to allow water from chamber 18 to flow through opening 80 into channel 78 under the control of suitable flow regulating means, such as float valve 82, to control the level of water within channel 78. This serves as a moat to prevent ants and the like from climbing up base 12 and bowl 14 to contaminate the water 28 or food contained within bowl 14. Finally, reservoir 16 is formed with an open end 82 and removable means, such as lid 84, is provided to enable the user to renew the supply of water or food within the reservoir 16. Alternatively, if desired, suitable means, such as threaded coupling 86 may be provided to enable the user to connect a hose 88 or other suitable source of continual supply to replenish the water within reservoir 16.

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. A pet food dispenser comprising:

a base, a bowl mounted on said base for retaining a quantity of a substance to be dispensed, and a reservoir mounted adjacent one side of said base and operable to deliver a desired substance into said bowl, the upper end of said reservoir being sealed whereby atmospheric pressure acting on the surface of the substance in said bowl will prevent flow of said substance out of said reservoir to overflow said bowl said bowl being formed with a rearward extension and said reservoir being mounted on the upper surface of said extension.

2. The dispenser of claim 1 further comprising:

a cover movable into and out of a position to cover said bowl.

3. The dispesnser of claim 2 wherein:

said cover comprises a ring and a lid each hingedly mounted on said bowl.

4. The dispenser of claim 2 further comprising:

motion sensing means mounted on said dispenser to sense approaching pets, and means actuable by said motion sensing means for raising and lowering said cover.

5. The dispenser of claim 1 wherein:

said base is solid.

6. The dispenser of claim 1 wherein:

said base is hollow and is formed with an opening to allow said base to be filled with ballast.

7. The dispenser of claim 1 wherein:

said bowl has an opening to provide access by a pet to material contained in said bowl and has an extension formed with an opening to receive a portion of said reservoir.

8. The dispenser of claim 1 wherein:

said reservoir is hollow and has a neck communicating with said bowl to allow material from within said reservoir to flow into said bowl.

9. The dispenser of claim 1 wherein:

said reservoir is provided with flow control means to regulate the flow of material out of said reservoir.

10. The dispenser of claim 9 wherein:

said flow control means comprises a handle, a valve operable to limit flow of material out of said reservoir, and a connecting rod connecting said handle to actuate said valve.

11. The dispenser of claim 10 wherein:

said handle is mounted on said reservoir at a pivot point and said connecting rod is connected to said handle beyond said pivot point.

12. The dispenser of claim 10 wherein:

said handle is mounted on said reservoir at a pivot point and said connecting rod is connected to said handle at a point before said pivot point.

13. The dispenser of claim 9 wherein:

said flow control means comprises a ball valve located within said reservoir and, means carried by said bowl for displacing said ball valve to allow material to flow from said reservoir into said bowl.

14. The dispenser of claim 1 wherein:

said bowl is integral with said base.

15. The dispenser of claim 1 wherein:

said reservoir is releasably attached to said base to enable a user to lift and transport said dispenser by grasping said reservoir.

16. The dispenser of claim 1 further comprising:

means for connecting a source of water to continually supply said reservoir.

17. The dispenser of claim 1 wherein:

said reservoir has an open upper end to enable a user to resupply the material within said reservoir, and a removable cap for covering said upper end.

18. A pet food dispenser comprising:

a base, a bowl mounted on said base for retaining a quantity of a substance to be dispensed, and a reservoir mounted adjacent one side of said base and operable to deliver a desired substance into said bowl, a generally L-shaped flange encircling said base to define a moat about said base, an opening formed in said base communicating said moat with the interior of said base, and means for regulating the flow of water from said base into said moat.

* * * * *